March 1, 1955 P. A. RAHAIM 2,702,926
DOWEL PIN
Filed Aug. 27, 1949
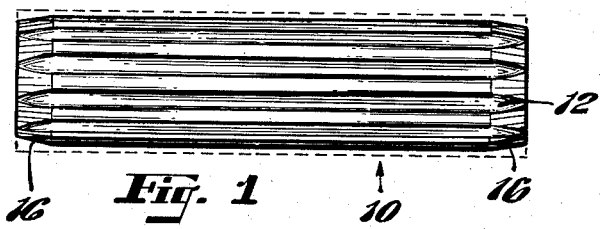
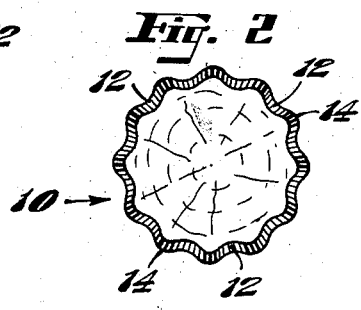
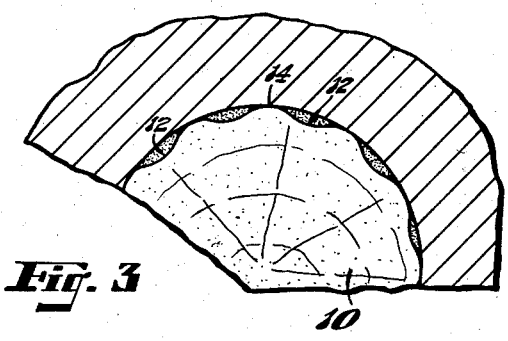
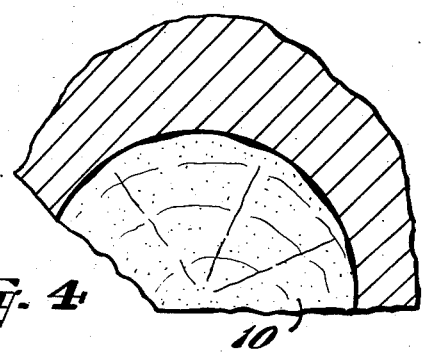
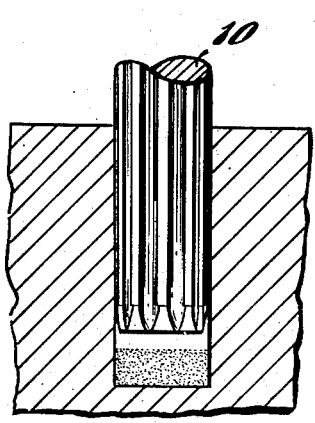
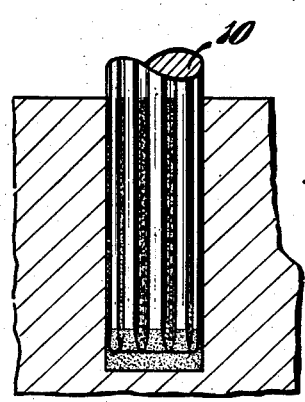
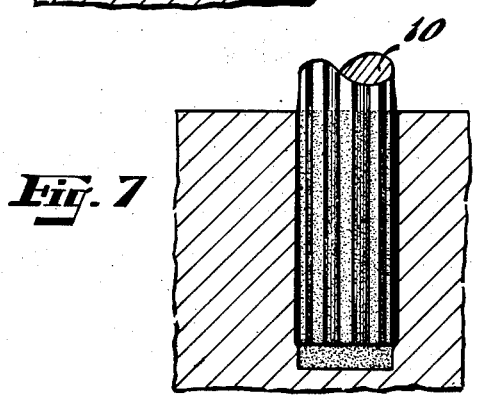
Inventor
Peter A. Rahaim
by Kenway, Jenney, Witter & Hildreth
Attys.

United States Patent Office 2,702,926
Patented Mar. 1, 1955

2,702,926

DOWEL PIN

Peter A. Rahaim, Gardner, Mass., assignor of one-half to Robert B. Russell, Newton, Mass.

Application August 27, 1949, Serial No. 112,684

3 Claims. (Cl. 20—92)

This invention relates to wood joint connectors and more particularly to dowels and dowel pins which have been reduced in diameter by compression and which are employed in wood joining while still in a compressed state. In one aspect this invention consists in the provision of a compressed dowel pin having grooves or passages additionally compressed therein which communicate with the ends of the dowel pin whereby glue passes upwardly from the bottom of the mortise along the walls of the dowel pin and mortise and is thereafter distributed under compression between the said walls while the glue sets. In another aspect this invention consists in the provision of a compressed dowel pin having an additionally compressed, beveled end whereby an effective seal against moist atmosphere is attained. This application is a continuation-in-part of my abandoned previous application Ser. No. 84,557, filed March 31, 1949.

The wood joining industry has long been searching for an improved means for joining wood which would combine the economy features of the conventional dowel pin with improved qualities of strength. Dowel pins are the most practical means known for many types of wood joining because they are very cheap and their use merely entails drilling appropriately located mortises, putting glue therein, and inserting the dowels. However, dowel pin joints are not very strong particularly after extended periods of drying, and for this reason the industry has gone to great lengths and ingenuity to develop stronger joining means. Numerous types of dovetailing joints have been developed, but as yet none has been commercially practical because of the extra cost brought about by the irregularities of design, and furthermore in general they have not formed appreciably stronger joints than the conventional dowels because the wood readily cracks with the grain through the widened portion of such dovetails.

The reasons for the weakness of conventional dowel pin joints are numerous and have not been adequately explored in the past. Tests have demonstrated that the weakest point of a conventional dowel pin joint is the bond between the dowel and the mortise and that such joints invariably rupture in the bond rather than in the wood. If it were possible to make the bond between the walls of the dowel and the walls of the mortise as strong as for example the bond between two lamina of a plywood board, dowel pin joints would be many times stronger than hitherto known. This is attributable to the fact that the bond between the lamina of plywood can be made much stronger than the wood itself whereas the bond between the conventional dowel pin and the mortise never approaches such strength. Tests demonstrate that joints formed with conventional dowel pins invariably break in the bond and not in the wood. However, such firm bonding with dowel pins has hitherto been thought impossible because of the difficulties encountered in subjecting the opposed walls of the dowel and mortise to pressure during bonding.

It is a fundamental principle in the art of joining articles together by adhesives that the thinner the bond and the more even the distribution of adhesive the stronger the joint. For this reason, in laminated wood structures great strength may be attained because the glue may be applied very evenly and then reduced in thickness to an absolute minimum by pressure applied while the glue sets. With conventional dowel pins, however, it is almost impossible to get an even distribution of glue between the dowel and mortise and furthermore there has been no hitherto known way to apply pressure to the bond while the glue sets. Dowel joints have a further cause for weakness not seen in laminated bonding in that the wood dries out with age, and the pin tends to contract away from the mortise, greatly weakening the joint. Furthermore, if the dowel fits the mortise snugly, it is practically impossible to get glue between it and the mortise, but if the dowel is loose, then the joint formed is extremely weak.

Numerous efforts have been made to improve the bond between dowel pins and mortises. One attempt comprised carving a spiral groove into the side walls of the dowel. Some success was attained by this feature because the glue was more evenly distributed, but I have learned that joints so formed fall far short of the optimum strength possible. Another attempt included carving transverse grooves in the dowel pin and for the same reasons failed to achieve any substantial success. These and other unsuccessful attempts to improve dowel pins have finally turned the attention of the industry towards perfecting glues and exploring oher possible channels of improvement.

It is an object of my invention to provide a dowel pin which will be employed in a conventional mortise and have all the other features of convenience of a dowel pin, but yet at the same time perform the dual function of both effecting an even distribution of glue between the pin and the mortise and forming the bond under substantial pressure.

It is another object of my invention to provide a dowel pin with which it will be possible to attain an extremely thin bond between it and the mortise and thereby approach in strength the bond attainable in laminated wood construction.

Another object of my invention is to provide a dowel pin which will not contract away from the walls of the mortise to the same degree as conventional dowel pins.

Additional objects of my invention include the provision of a tougher and stronger dowel pin than the conventional dowel pin, the provision of a dowel pin that will form a strong joint even if it does not fit the mortise absolutely snugly, and the provision of a dowel pin which will have the above outlined advantages but yet not be affected by adverse conditions of humidity.

In the accomplishment of these objects, I employ a dowel pin which has been compressed down from for instance $\frac{7}{16}''$ diameter to $\frac{3}{8}''$, by means of a series of opposed grooved rolls. The type of compression is important because the fibers must not be damaged. It is possible to effect such compression by other means, but I have found that the grooved roll, by contracting the dowel on a transverse line of contact which progresses along the dowel does not create such a violent compression as to crush the dowel fibers, but yet accomplishes the prescribed compression. For the purpose of obtaining adequate glue distribution, I provide longitudinally extending grooves which communicate with the ends of the dowel. Thus when the bottom of the mortise is filled with glue and the dowel pin is driven therein, part of the glue is driven up the grooves between the dowel and mortise. And, finally, the remaining glue in the bottom of the mortise, provides moisture which gradually progresses up the central fibers of the dowel pin by capillary action causing both the pin and the grooves therein to expand and form the bond between the dowel and mortise under substantial pressure. With such pressure the glue is either driven into the pores of the surrounding wood or squeezed out and the bond between the dowel and mortise is rendered both thin and extremely strong.

A further feature of my invention stemming from the compressed nature of the dowel pin is that during extended periods of drying it is much less susceptible to contraction than conventional dowels.

An additional feature of my invention is an additionally compressed, beveled end for the dowel pin. Thus the ends of the dowel are compressed in three ways, first when the entire pin is compressed; second when the grooves are compressed; and third when the beveled end is compressed.

Further objects and features of my invention will best be understood and appreciated from a detailed description of a preferred embodiment thereof selected for purposes of illustration and shown in the accompanying drawings in which:

Fig. 1 is a plan view of the dowel pin of my invention,
Fig. 2 is an end view of the said dowel pin,
Fig. 3 is an end view in cross section of the dowel pin in the mortise prior to expansion,
Fig. 4 is an end view in cross section of the dowel pin in the mortise after expansion and setting of the glue,
Fig. 5 is a view in side elevation of the dowel pin entering a mortise which is represented sectionally,
Fig. 6 is a view of the dowel pin fully inserted into the mortise, but prior to expansion, and
Fig. 7 is a view of the dowel pin in the mortise after expansion.

The preferred embodiment of my invention herein shown comprises a 7/16" diameter dowel pin designated at 10 compressed down to 3/8" diameter as illustrated diagrammatically in Fig. 1 wherein the dotted lines represent the original size and shape of the pin. It will be understood that these exact dimensions are not essential to the practice of my invention. The key to the degree of compression is that it must bring a larger dowel down to the size of a smaller mortise such that when the glue expands the dowel, the expansion will be sufficient to exert substantial pressure against the mortise. I have found that a dowel 5% larger than the mortise compressed to the size of the mortise is satisfactory. Even less compression is feasible, but the beneficial effects of expansion drop rapidly under 3%. The upper limit of compression is in the neighborhood of 30%. It should not be so great as to crush the fibers.

The compression is achieved by passing the pin through a number of grooved rolls which contact the pin only on a transverse line. As the pin proceeds through the rolls the grooves of the rolls are successively smaller and as the transverse line of contact progresses along the dowel a gentle kind of kneading action is brought about. This kneading action has the effect of raising the temperature of the dowel markedly, thereby softening the rosins therein and rendering it easier for the fibers to seat more closely to one another. However, the exact type of compression herein described is not an absolute necessity for the production of the dowel pin of my invention. Other types of compression may be employed provided that they neither rupture the fibers nor disrupt the fiber structure in such a way as to materially weaken it. The reason for this is that the surface of the dowel pin must remain firm and solid so that when a good bond is effected, the wood will not readily part from it. The type of compression herein described is suitable for achieving the desired result, and the preferred dowel pin produced thereby and described herein has a firm surface despite upwards of 10% permanent compression. Tests have demonstrated that the average 3/8" diameter preferred dowel pin of this invention will break when bent under a force of 650 lbs. This represents a marked contrast to conventional 3/8" diameter spiral grooved dowel pin which breaks on the average at 325 lbs. bending pressure. Furthermore, the actual break of my dowel pin is not abrupt and clean as in the conventional dowel, but rather slow and with great toughness.

As herein shown a series of grooves 12 are additionally compressed into the dowel pin 10, and leave lands 14 projecting to the diameter of the dowel pin 10 in the compressed state. The grooves 12 and lands 14 are rounded for reasons which will become apparent as the use of the dowel pin 10 is described below. In this preferred embodiment, the grooves 12 are represented as extending parallel to the axis of the dowel pin 10. However, such is not mandatory so long as the groove ends communicate freely with the dowel ends for the upward passage of glue as will be further elaborated presently. The manner of compressing the grooves, as with the over-all compression, is critical only to the extent that it does not cause any weakening or crumbling of the dowel pin surface while still attaining the desired compression.

At each end of the dowel pin 10, it is additionally compressed by 25-40% to form a beveled end 16. Traditionally, dowel pins have been given a slightly beveled end for the purpose of aiding location of an over-sized pin in the mortise. As such it is not necessary to bevel the end of the dowel pin of my invention, because the dowel pin 10 need not fit tightly into the mortise prior to gluing. However, compressed wood tends to swell in humid climate, and I have found that compressing the ends substantially more than the main body of the dowel pin 10 provides an effective seal against unfavorable atmospheric conditions, but yet such sealing does not prevent the glue from expanding the dowel when that becomes desirable. Tests have demonstrated that dowel pins compressed as herein described only expanded .002" during three months' exposure to relative humidity conditions running constantly above 80.

Forming a joint with the dowel pin of my invention will now be described. The first step is to deposit a quantity of glue in the bottom of the mortise and thereafter insert the dowel pin 10 as is shown in Fig. 5. The next step is to drive the dowel pin into the mortise and cause the glue to seek passage upward through the grooves 12, as is shown in Fig. 6. Thereafter, the moisture of the glue rises into the body of the dowel pin by capillary action causing it to expand and exert pressure against the walls of the mortise. During such expansion, the grooves 12 likewise expand outward and attempt to render the dowel pin cylindrical. This latter expansion coupled with the fact that the lands are rounded, causes the glue to distribute right up to the line of contact between the lands and the mortise. Generally speaking, since the dowel pin may be smaller than the mortise, the glue actually distributes over the entire area. As the grooves 12 and dowel 10 expand outwardly, they exert tremendous pressure against the walls of the mortise, driving the glue both into the pores of the wood and driving excess glue upward or downward along the dowel pin. It will be noted, furthermore, that the mortise itself expands as shown in Fig. 7, due to the outward expanding force of the dowel pin and thereby its pores are in turn widened for the reception of glue.

After final expansion of the dowel pin and setting of the glue, the dowel pin 10 returns substantially to its original shape with only faint traces of the grooves 12 remaining, and with the beveled end fully expanded as shown in Fig. 7. The pin does not, of course, return to its original diameter because of the constriction upon it from the mortise but yet is slightly larger than in the fully compressed state, and the mortise is likewise slightly larger than prior to the dowel pin's expansion.

The bond formed by the dowel pin herein described is strikingly superior to any dowel pin bond hitherto known and capable of commercial use. Comparative tests demonstrate that a 3/8" diameter dowel of my invention having a 3/4" holding length requires on the average 1625 lbs. to pull it out of the mortise after three days of normal drying, whereas the conventional spiral grooved dowel of the same dimensions and under the same conditions requires only 1125 lbs. to pull it out. After one month's normal drying the pin of my invention requires 1600 lbs. to pull it out of the mortise, whereas the conventional dowel requires only 820 lbs. Further tests in an attempt to simulate age demonstrate that after 24 hours of normal drying and 5 hours in an oven at 150° F., the dowel of my invention pulls out on an average at 1350 lbs., whereas the conventional dowel pulls out at 650 lbs. In addition to this, the tests show that the wood ruptures at times prior to the bond, in contradistinction to conventional dowel joints.

While it is not an empirically proven proposition, I attribute these vastly superior results to the fact that the bonding and setting of the glue is accomplished under extreme pressure of the expanding wood of the dowel against the mortise, to the evenness of distribution of the glue by the expanding grooves, and to the thinness of the bond created by the pressure applied prior to the final setting of the glue. The improved performance data with respect to age would seem to be attributable to the fact that the wood in the dowel pin is more dense than the wood surrounding the mortise, and that during periods of fluctuating drying and then higher humidity, the more dense wood tends to swell slightly to accommodate contraction in the less dense surrounding wood.

While minor variations in the construction shown and described will be apparent to those skilled in the art, it is not intended to confine the invention to the precise form of the embodiment herein shown but rather to limit it in terms of the appended claims.

Having thus described and disclosed a preferred embod- iment of my invention, what I claim as new and desire to secure by Letters Patent is:

1. A dowel comprising an elongated wooden body compressed from end to end thereof, a multiplicity of alternate lands and grooves additionally compressed therein longitudinally thereof, the wood in the grooves being denser than that in the ribs, and the ends of the body being further compressed substantially to form a humidity seal for the said ends.

2. A dowel comprising an elongated wooden body, a multiplicity of longitudinally extending grooves therein, a reduced end thereon, the grooves extending into the reduced area of the end portion, the body being compressed, the grooves being more highly compressed, and the said end being still more highly compressed.

3. A dowel comprising an elongated wooden body, a multiplicity of longitudinally extending grooves therein, a reduced end thereon, the grooves extending into the reduced area of the end portion, the body being compressed, the grooves being more highly compressed, the said end being still more highly compressed, and lands alternating with the grooves and gradually lessening in height at the end.

References Cited in the file of this patent

UNITED STATES PATENTS

| | | |
|---|---|---|
| 569,235 | Rockwell | Oct. 13, 1896 |
| 991,722 | Hourd | May 9, 1911 |
| 1,687,207 | Hawker | Oct. 9, 1928 |
| 2,104,496 | Schaefer | Jan. 4, 1938 |
| 2,219,197 | Purtell | Oct. 22, 1940 |
| 2,263,198 | Valiton | Nov. 18, 1941 |